April 2, 1929.  F. J. FLAHERTY  1,707,262
PIPE ORGAN ACTION
Original Filed July 26, 1926  2 Sheets-Sheet 1
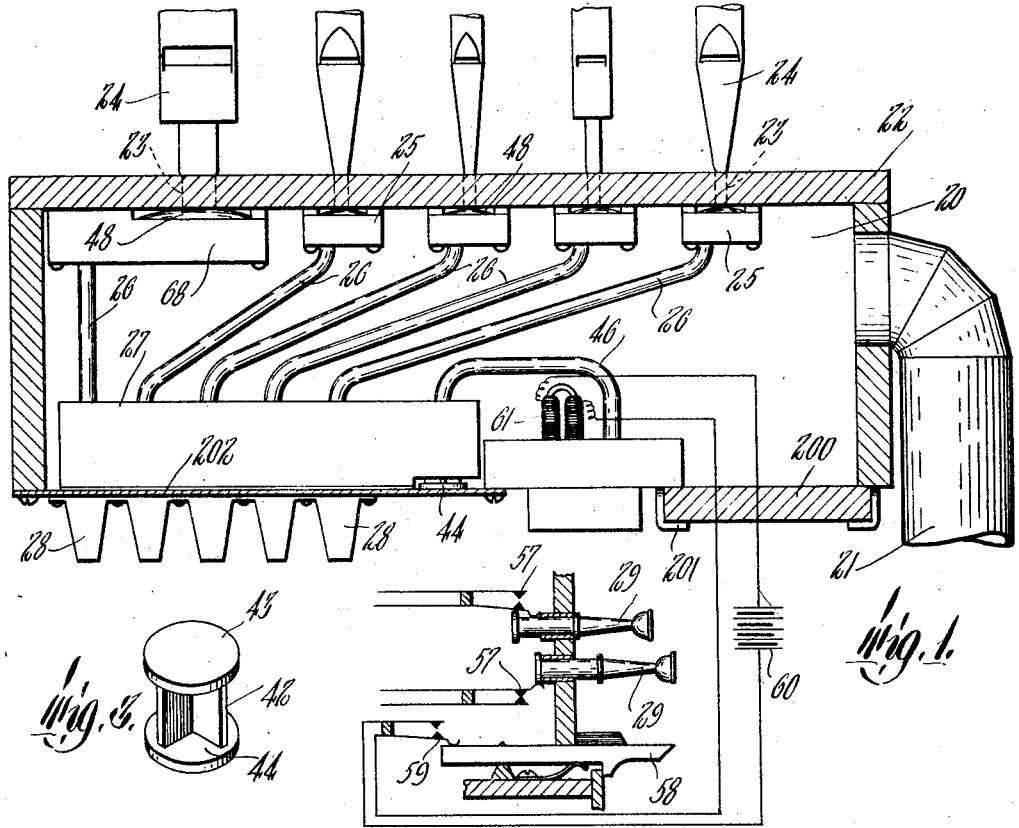
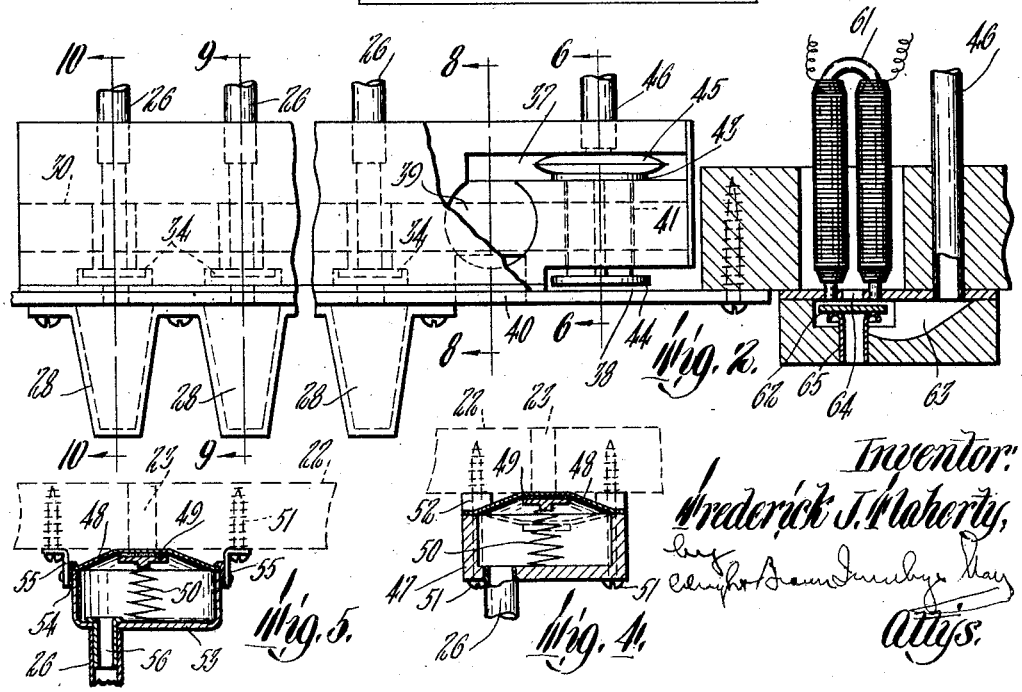

April 2, 1929.  F. J. FLAHERTY  1,707,262
PIPE ORGAN ACTION
Original Filed July 26, 1926  2 Sheets-Sheet 2

Inventor:
Frederick J. Flaherty,
by Alyho Brown Trunly May
attys.

Patented Apr. 2, 1929.

1,707,262

UNITED STATES PATENT OFFICE.

FREDERICK J. FLAHERTY, OF WILLIMANTIC, CONNECTICUT, ASSIGNOR TO JENNIE A. FLAHERTY, OF WILLIMANTIC, CONNECTICUT.

PIPE-ORGAN ACTION.

Application filed July 26, 1926, Serial No. 124,797. Renewed August 23, 1928.

This invention relates to apparatus for controlling musical instruments which are operated wholly or partly by wind, being more particularly designed for use in pipe organs or the like. An object of the invention is to provide an element which will make pipe organ actions of a construction which is simpler and more economical than any other now in use. It is also an object of the invention to provide an action which will be more responsive than previous actions, particularly as regards the larger pipes which require a relatively large flow of air when speaking. My invention is applicable not only to new construction, but is admirably adapted for installation in old organs, many of which have excellent pipes, but antiquated actions. In large pipe organs of today, involving from hundreds to thousands of pipes ranging widely in wind requirements, and scores of stops, the controlling apparatus is necessarily somewhat complex. Heretofore it has, however, been in most cases unduly complex and the parts have customarily been assembled in such a way that in order to get at a single valve for a simple repair, a comparatively large number of parts had to be removed in order to get at the part to be repaired. By my invention, I provide relatively simple units of standard size and construction so that in case of trouble with a valve the unit containing it can be replaced at once with a minimum of trouble. These units are capable of installation in any standard make of pipe organ and are arranged so as to be easily accessible. They are moreover compactly built and highly efficient in operation.

It is a further object of my invention to provide means for causing the pipes, large and small, to respond with uniform promptness when the keys are pressed. The hiatus between the pressing of a key and the response of the larger bass pipes, which is often very noticeable in many organs, limits the tempo of the music which can be played on such an instrument and is a source of constant annoyance to the musician. My construction and arrangement of valves is such that pipes of all sizes speak with equal promptness.

Further advantageous features and combinations will appear from the following description of the apparatus as illustrated in the drawings, of which Figure 1 is a diagrammatic showing of a portion of the action of a pipe organ illustrating my invention.

Figure 2 is a view partly in section showing the relative positions of my improved multiple valve elements, the stop channels, and the key-actuated magnets.

Figure 3 is a perspective of a valve used in my multiple valve element.

Figure 4 is a section of my improved individual organ pipe valve.

Figure 5 is a section similar to Figure 4 but showing a metal construction.

Figure 8:
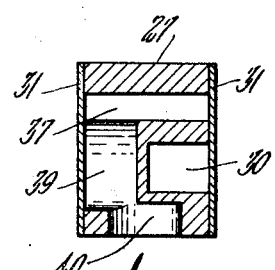
Figure 9:
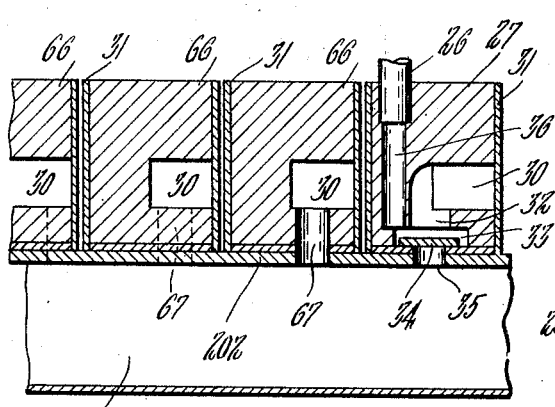
Figure 10:
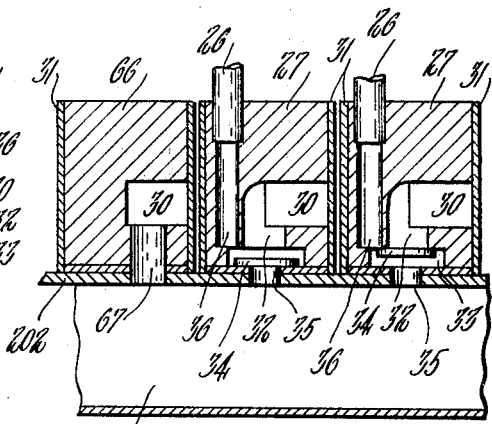

Figures 8, 9 and 10 are sections taken respectively on the lines 8—8, 9—9 and 10—10 of Figure 2.

Figure 11:
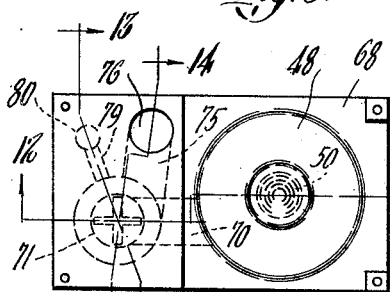

Figure 11 is a plan view of an individual relay valve adapted for use with the larger organ pipes.

Figure 12:
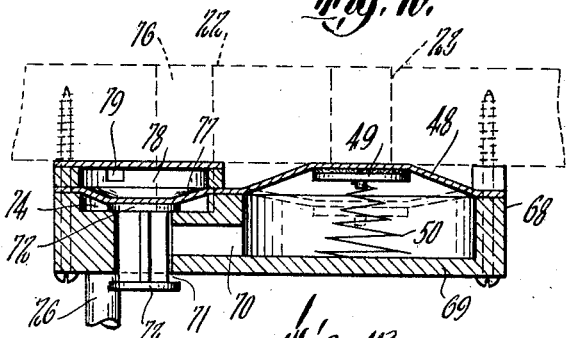
Figure 13:
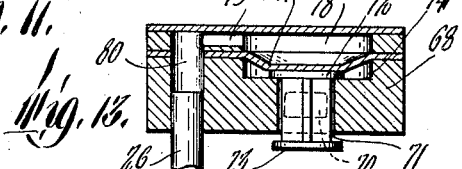
Figure 14:
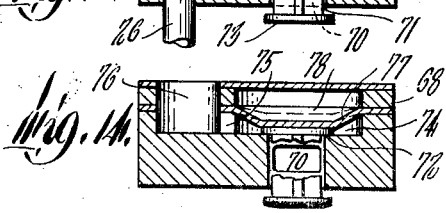

Figures 12, 13 and 14 are sections taken respectively on the lines 12—12, 13—13 and 14—14 of Figure 11.

In Figure 1, 20 represents the wind chest of a standard pipe organ which may be of any desired size or shape and which is supplied with wind through a duct 21 from a suitable blower not shown. The top member 22 of the wind chest is perforated, each perforation 23 being adapted to receive the end of a speaking pipe 24, the perforations being each of a suitable size to supply the correct amount of air to the pipe which is fitted thereover. Each perforation 23 is normally closed by an individual valve 25 which is connected for operation by a flexible tube 26 with a multiple valve element 27, which comprises a member having a number of valved passages equal to the number of different varieties of pipes. The number of valve elements 27 supplied is equal to the number of keys in one of the manuals of the console, this number usually being sixty-one or seventy-three. Hence the pipes capable of sounding a given note will all be connected to that element 27 which is in turn connected to the corresponding key of the manual. The elements 27 are preferably arranged side by side and extend transversely over channel members 28, each of the latter being associated with a stop 29 and communicating through the element 27 with a set of pipes of a certain variety. Each element 27 may have a valved passage connecting each of the channels 28 to its corresponding type of pipe through a tube 26. Thus the length of the valve elements 27 will be governed by the number of different kinds of pipes of the same note which can be played by a single key. Between the channel members 28 and the valve elements 27 I insert suitable gaskets 202 to prevent air leakage. These may be strips of ordinary blotting paper or the like. The wind chest 20 is preferably constructed with a removable strip or plate 200 which may be secured in place as by hooks or latches 201 or by any other equivalent means to afford quick removal. This plate affords ready access to the interior of the wind chest for the adjustment or replacement of parts contained therein.

Figure 6:
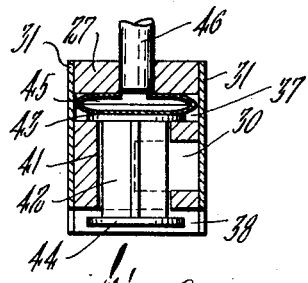
Figure 6 is a section on the line 6—6 of Figure 2.
Figure 7:
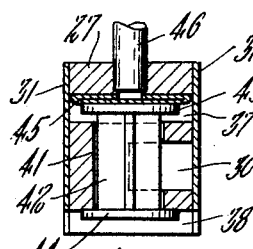
Figure 7 is a section similar to Figure 6, but showing the valve in a different position.

Referring to Figures 2 and 9, each multiple valve element 27 comprises an elongated block, usually of wood, in a side of which a longitudinal channel 30 is formed. The open side of this channel is closed as by a piece of paper or other suitable material 31 pasted on the side of the block. Communicating with this channel are a series of passages 32, each of which communicates with a valve chamber 33 which contains a valve element 34 consisting of a light disk. Each valve chamber 33 also communicates as by a passage 35 with one of the stop channels 28 and by a passage 36 with one of the tubes 26 which run to the individual organ pipe valves 25. As will be seen in Figure 10, the tube 26 communicates with the channel 28 when the valve member 34 is up and with the channel 30 when the valve member 34 is down. As will be seen in Figure 1, there is a stop channel 28 corresponding with each variety of pipe. Each multiple valve element 27 may contain the same number of valve disks 34, each valve disk being associated with one of the pipes 24 and its corresponding channel 28. At one end of each multiple valve element 27 is a supply and exhaust valve assembly which is illustrated in Figures 2, 6, 7 and 8. As shown in Figure 2, an upper recess 37 and a lower recess 38 are cut into the end of the member 27, the upper recess 37 communicating by means of a passage 39 of relatively large cross section with a port 40 in the bottom of the block. The strip of paper 31 which is pasted on the side of the block 27 is carried around the end thereof, thus making an enclosed chamber of the recess 37. A relatively large passage 41 connects the chamber 37 with the channel 30 and the recess 38. When the multiple valve element 27 is installed in an organ wind chest, as shown in Figures 1 and 2, the channel 30 communicates through the passage 41, the chamber 37, the passage 39, and the port 40, with the open air, and communicates through the passage 41 and the recess 38 with the wind chest. It is obvious that in case it should be desired to place the valve member and stop channel assembly entirely within the wind chest, the port 40 should be connected by a suitable tube to the open air. The passage 41 is preferably a circular boring and receives slidably therein a compound valve member (Figure 3) comprising a valve stem 42 of cruciform cross section, to the ends of which are secured suitable disks 43, 44. As shown in Figures 6 and 7, when the compound valve is in its lower position, the disk 43 seats over the upper end of the passage 41, thus cutting off communication of the channel 30 with the open air. When the valve is raised, as in Figure 7, the disk 44 seats against the lower end of the passage 41, thus cutting off the channel 30 from the wind chest and connecting it with the open air. The action of the compound valve is controlled by a pneumatic expansion member 45 comprising a flat bag of thin flexible material which communicates through an opening in the top of the block 27 with a tube 46. When the expansion member 45 is expanded by air pressure received through the tube 46, it holds the compound valve member in its lower position, as in Figure 6. When the pressure in the tube 46 and the expansion member 45 is reduced to normal, the wind chest pressure in the recess 38 acting on the disk 44 pushes the compound valve 43, 44 to its upper position as in Figure 7. Instead of making the elements 27 as separate individual units, I may if desired group two or more in a single block, the channels 30 in such a case being cut into the upper face of the block, but the single separate element for each key is simpler to handle and is therefore considered preferable.

Before describing the operation of the various valves contained in the valve element 27, I will describe briefly the individual valves 25 which admit air directly from the wind chest to the organ pipes. The valve 25 comprises a box 47 (Figure 4) over the top of which is pasted or otherwise secured a thin flexible membrane or diaphragm 48. The box 47 is preferably formed of a wooden block having a circular hole bored therein. Concentrically disposed with respect to the circular hole is a light disk 49 which may be of felt or equivalent material preferably stiffened with a backing of cardboard or the like, and which is secured to the membrane 48 and against which may press a light spring 50, the other end of which rests on the floor of the box 47. The box 47 is secured to the under side of the top or ceiling 22 of the wind chest as by pins or screws 51 which pass upwardly through the side walls of the box and through small spacing blocks 52 which hold the upper surface of the box 47 spaced from the ceiling 22 to permit free access of the wind in the chest to the upper surface of the membrane 48. Each box 47 is so disposed that the central portion of the membrane 48 which is backed by the disk 49 will be pressed against the opening 23 which communicates with the organ pipe 24. A small hole is bored in the bottom of each box 47 which communicates with one of the tubes 26. The pressure within the box 47 is normally equal to the pressure in the wind chest, so that the spring 50 holds the disk 49 and the central portion of the membrane 48 against the openings 23 and thus prevents the pipe 24 from speaking. When, however, the pressure in the box 47 is reduced to atmospheric through the tube 26, the wind pressure in the chest acting on the upper surface of the membrane 48 depresses the disk 49 against the light pressure of the spring 50 and rushes upwardly through the perforation 23 into the pipe 24. The pipe thus speaks until wind pressure is introduced through the tube 26 into the box 47. This balances from below the chest pressure on the upper surface of the membrane 48 and allows the spring 50 to close the passage 23. Instead of using a spring 50 to aid the pressure within the box in making the forces against the inner face of the membrane 48 greater than those on the outer face, and thus to hold the membrane over the opening 23 when chest pressure is in the box 47, I may bring about the difference of forces by other means, as, for example, by introducing into the box 47 wind pressure greater than chest pressure, in which case the spring 50 could be dispensed with. The location of the stiffening disk 49 below the membrane 48 enables the latter to present a smooth surface to the air currents rushing into the passage 23. Eddy currents at the lower opening of the passage 23 are thus avoided, and the pipe speaks more promptly and evenly as a result. Figure 5 shows an individual valve equivalent to that shown in Figure 4, but constructed chiefly of sheet metal. As shown, a circular box 53 may be stamped from a sheet and the membrane 48 secured to the top thereof as by a clamping ring 54. Suitable brackets 55 may be employed to support the box in suitable spaced relation from the ceiling 22. A nipple 56 may be secured in the bottom of the box 53 to facilitate the connection thereof with the tube 26.

The operation of the apparatus thus far described is as follows:

Assuming that the blower is being operated and there is pressure in the wind chest greater than atmospheric, when the organ is not being played and no stops are pulled out, the chest pressure will extend through the passage 41 and the channel 30 (Figure 6), also through passages 32 and 33 (Figure 10) to the tubes 26 and the valve boxes 47. Chest pressure will also be found in the expansion members 45, the tubes 46, and the stop channels 28. If now a stop 29 is pulled out, an electric connection 57 is closed, whereby the pressure in the corresponding channel 28 is reduced to atmospheric by means to be described hereinafter. Thus the pressure on the lower face of the disk valve 34 in each of the multiple valve members 27, which is directly above that particular channel 28, is atmospheric, while the pressure on the upper face of these disks is chest pressure. When a key 58 is depressed, a contact 59 is made whereby current from a suitable source of electrical energy, such as a battery 60, is sent through an electro-magnet 61. Referring to Figure 2, the energization of the magnet 61, which as will be seen is located within the wind chest, raises an armature valve member 62 which is located in a valve chamber 63. This closes a passage 64 which connects the chamber 63 with the wind chest and opens the chamber 63 to the atmosphere through a port 65. The chamber 63 is connected by a tube 46 with the expansion member 45 in the multiple valve element 27 which corresponds to the key depressed. Since the energization of the magnet 61 opens the tube 46 to the atmosphere, the expansion member 45 is collapsed by the upward wind chest pressure against the disk 44. This raises the compound valve 43, 44, cutting off the channel 30 from chest pressure and connecting it with the atmosphere through the chamber 37 and the port 40. The pressure in the channel 30 is thus at once reduced to atmospheric. Referring to Figure 9, it will be seen that if the pressure in the channel 28 is atmospheric, the reduction of pressure in the channel 30 to atmospheric will not raise the disk 34, but will reduce the pressure in the tube 26 to atmospheric. This at once reduces the pressure in the corresponding valve box 47 and permits the pipe to speak, as previously described. If, however, as in Figure 10, the stop corresponding to the channel 28 has not been pulled out and the pressure in the channel 28 is that of the wind chest, then when the key controlling the channel 30 is depressed allowing the pressure in the channel 30 to fall to atmospheric, the chest pressure in the channel 28 will blow the disk valve 34 to its upper position, cutting off the tube 26 from the channel 30 and maintaining chest pressure in the former, so that the pipe does not speak when the key is depressed unless the corresponding stop is also drawn out. In other words, when a stop is in, its corresponding valve 34 in each block 27 is responsive to the actuation of the corresponding key and moves to its upper position to cut off communication of its tube 26 with the channel 30. When the stop is out, the valves 34 corresponding thereto are restrained from responding to the actuation of the keys and thus communication between the tubes 26 and the channels 30 is maintained, causing the pipe to speak when the key is pressed. When the key 58 is released and allowed to rise the contact 59 is broken, the magnet 61 is deenergized, the armature valve 62 descends, closing the exhaust port 65 and connecting the chamber 63 with the wind chest through the passage 64. This restores wind chest pressure to the tube 46 and as a result the expansion member 45 is inflated, pushing the compound valve 43, 44 to its lower position, whereby the channel 30 is cut off from the chamber 37 and the open air, and is connected through the recess 38 with the wind chest. Restoration of wind chest pressure in the channel 30 results in pressure being restored to all the pipes 26 which are in communication with that particular channel, so that all the pipes associated with the key 58, which have been speaking, become silent.

The pressure in the channels 28 is preferably controlled by means of valve blocks 66, the construction of which may be identical with that of the multiple elements 27, except that the valves 34 and the passages connected therewith are omitted. Instead of these, a single tube 67 may be used to connect the channel 30 of the block 66 with a corresponding channel 28, the pressures in this channel 30 being controlled by the operation of a compound valve 43, 44 in response to the pulling out of a stop in exactly the same manner that the pressures in the channel 30 of a block 27 are controlled by movement of a key 58. Thus the entire control mechanism may comprise a block 27 for each key of a manual (usually sixty-one) and an additional block 66 for each stop. With this construction, repairs are easily and quickly made with a minimum of disassembling of apparatus. Since the blocks 27 and 66 are standard and each interchangeable with others of the same kind, a defective valve in any one of them may be replaced by replacing the block containing the defective valve with another similar block. As will be seen, this involves merely the disconnecting of a few tubes 26 and the replacement of the defective block with a new one, which is a simple matter since the block 27 is secured in place by a few screws the heads of which are on the outside of the chest and therefore most accessible. The use of the flexible tubes 26 and the individual pipe valves 25 permits great freedom in the location of the individual organ pipes and also facilitates the repair or replacement of defective valves 25.

The larger bass pipes of an organ such as the 16-foot and 32-foot pipes require a relatively large volume of air to speak properly. This necessitates a valve of such size that an appreciable interval of time would be required to allow the box 47 to exhaust through the usual size of the tube 26, which is commonly employed. In order to prevent such possibility of slight delays in the speaking of the larger pipes, I provide a relay valve 68 which is illustrated in detail in Figures 11 to 14. A box 69 similar to the box 47, but larger in size, may contain a spring 50 supporting a disk 49 secured to the underface of a membrane 48 which extends over the top of the box 69, the portion of the membrane 48 which is backed by the disk 49 being positioned to register with the passage 23 which leads to the pipe. A relatively large passage 70 connects the inside of the box 69 with a vertical passage 71 in which is fitted a compound valve 72, 73 similar in construction to the valve 43, 44 shown in Figure 3. This valve when in its lower position connects the inside of the box 69 with the wind chest through the passage 71. When the valve is raised, the interior of the box 69 is connected through the passage 71 with a chamber 74 which communicates to the open air by suitable passages 75, 76 of relatively large cross section. Thus when the valve 72, 73 is raised, the pressure in the box 69 is quickly dropped to atmospheric through a system of relatively large passages. The action of the valve 72, 73 is controlled by a thin flexible diaphragm or membrane 77 which extends between chamber 74 and upper chamber 78. The latter is connected as by suitable passages 79 and 80 to a tube 26, which is of standard size and which leads to one of the passages 36 in in a multiple valve element 27, or to a tube 46 which leads directly to a chamber 63. The latter mode of connection may be preferred for the bass pipes which are mounted on a pedal chest, the stop action in such case being electrical. When the pipe is silent, wind chest pressure is in the tube 26 and therefore in the chamber 78. This pressure acts upon the compound valve 72, 73 to hold it in its lower position so that the chest pressure is communicated from below to the passage 71 into the interior of the box 69, thereby cooperating with the spring 50 to hold the disk 49 over the end of the passage 23. When a key is depressed, which results in a reduction of pressure in the tube 26 to atmospheric, the pressure in the chamber 78 is at once reduced, permitting the chest pressure to act on the disk 73 to elevate the valve 72, 73. This at once cuts off the interior of the box 69 from the wind chest and opens a large exhaust passage for the quick reduction of the pressure in the box 69 to atmospheric. The pipe therefore speaks as promptly as those having small valves.

This valve structure which enables the proper operation of the larger pipes through tubes 26 of standard size permits unlimited freedom in the placing of the pipes over the ceiling of the wind chest in any relative positions desired. This prevents the crowding together of the larger pipes and the undesirably wide spacing of the smaller pipes which is necessitated by most of the present methods of organ construction.

Having thus described an embodiment of my invention, it should be evident to those skilled in the art that many changes and modifications may be made therein without departing from its spirit or scope as defined by the appended claims.

I claim:

1. In a pipe organ having a key board and stops, a unitary multiple-valve control member having a main air channel therein and a plurality of passages leading from said channel, a supply and relief valve carried by said member and controllable by a key of the key board to connect said channel to wind-chest or atmospheric pressure, and a valve in each of said passages, each of said passage valves being controllable by a stop to close or leave open its passage when the key is depressed according as the stop is in or out.

2. A primary and stop-action element for use in pipe organs or the like, comprising a unitary member having a main passage and plurality of branch passages connecting therewith, each said branch passage being adapted to be connected with a pipe valve corresponding to the stop, a supply and relief valve associated with said main passage, and means in each branch passage actuable to close said branch passage.

3. A primary and stop-action element for pipe organs having keys and stops, comprising a block having a passage therein, a main valve controlling the supply of air to and from said passage and responsive to actuation of one of the organ keys, said element having also a number of ports, there being one port for each stop associated with said key, and valves controllable by said stops to control the passage of air through respective ports when said key is actuated, each port being connectible with a pipe corresponding to its controlling stop and to said key.

4. A primary and stop-action element for use in pipe organs having pipes, pneumatically operated pipe valves, stops, stop channels, keys and key-controlled pneumatic relays, comprising a unitary member adapted for use with one of the keys and having a main valve and a plurality of stop valves therein, said main valve being pneumatically connectible with a key-controlled relay, each said stop valve being pneumatically connected with the main valve and connectible with one of said stop channels and the pipe valve corresponding to said stop and key.

5. A primary and stop-action element for use in pipe organs having keys and stops, comprising a unitary member having stop ports, pipe ports, a main valve responsive to actuation of one of the keys, and a plurality of supplemental valves, each of said supplemental valves being pneumatically connected with said main valve and with a stop port and a pipe port through the walls of the member, the arrangement being such that when a certain pressure exists in the stop port, pressure changes at the main valve are transmitted to the pipe port, and when another certain pressure exists in the stop port, pressure changes at the main valve are not transmitted to the pipe port.

6. In a pipe organ action in combination, a plurality of channel members, a plurality of multiple-valve members arranged transversely of said channel members, each multiple-valve member having ports registering with corresponding ports in each channel member, an elongated channel, and a plurality of passages, each passage connecting said elongated channel with one of said ports and with an opening adapted to be connected with an individual pipe valve, a supply and relief valve carried by said multiple-valve member, and means for controlling said supply and relief valve to connect said elongated channel with chest or atmospheric pressure.

7. In a pipe organ having a wind chest, a key board and stops, the combination with a series of elongated stop channels of a series of multiple-valve control members of uniform construction, there being a stop channel for each stop, and a control member for each key of the key board, each control member being disposed transversely across the stop channels and having ports communicating with the stop channels, each control member also having a main air channel therein normally containing air at wind-chest pressure and branch passages leading from said main channel for operative connection with individual pipe valves, there being a branch passage corresponding to each stop channel, means for reducing the pressure in the main channel to atmospheric when the corresponding key is pressed, and a valve in each branch passage actuable by chest pressure in the corresponding stop channel to shut said passage when the pressure in the main channel is reduced to atmospheric.

8. In a pipe organ the combination with a plurality of stop channels, of a plurality of unitary members of uniform external dimensions, each of said members having a main channel therein and a supply and relief valve controlling the air pressure in said channel, some of said members each having a single branch passage connecting the main channel with one of the stop channels, others of said members each having a plurality of branch passages each adapted to connect the main channel pneumatically with a pipe valve, and a valve in each branch passage responsive or not to changes of pressure in the main channel of its member according to the pressure conditions in the corresponding stop channel.

9. In a pipe organ having an individual valve for each pipe, a key board and a plurality of stops, means responsive to actuation of the stops and a key for controlling the pipes responsive to said key, said means comprising a unitary member having a main air channel and passages connecting said channel with individual pipe valves, said channel and passages normally having wind-chest pressure therein, a valve actuable to relieve the chest pressure in said channel when the corresponding key is pressed, and means contained in said member and controlled by said stops for shutting off each pipe valve from said channel or not when the key is pressed according as the stop corresponding to said pipe is in its in or out position.

10. A device of the class described, comprising a multiple-valve member having a supply port, an exhaust port, a series of stop-channel ports, a series of pipe-valve ports, a main channel, main passages connecting said main channel with said supply and exhaust ports, and branch passages each connecting said main channel with a stop-channel port and a corresponding pipe-valve port, a double valve operable to open either of said main passages and simultaneously to close the other, and a valve in each branch passage operable to connect the pipe valve associated therewith to either the corresponding stop-channel port or the main channel and simultaneously to close it off from the other.

11. A device of the class described, comprising a member having formed therein an elongated channel extending lengthwise thereof, a series of valve chambers connecting passages leading from each of said chambers to said channel, outlet passages leading from each of said chambers to the surface of the member at two spaced points, a main valve chamber, and two main passages extending from different points on the surface to said channel through said main valve chamber; in combination with a valve element in each said valve chamber adapted to close the connecting passage leading from the chamber or one of said outlet passages from the chamber, according to the position of the valve element, a main valve member in said main valve chamber adapted to connect said channel with one of said main passages and to shut off the other main passage, or vice versa, according to the position of the main valve element, and means for operating said main valve element.

12. In a pipe organ having a key board, a plurality of sets of pipes and a wind chest, in combination, a separately detachable individual pneumatically-operated valve member for each pipe, a unitary detachable control member pneumatically connected with the valve members of the different pipes responsive to the same key, said control member having valves therein, each responsive both to one of the stops and to the key corresponding to the pipes.

13. An individual organ pipe valve comprising a box having two closed chambers therein and a two-way passage connecting one chamber with the other and with the outside of the box, the first said chamber having a flexible substantially air-tight diaphragm on the top thereof, a stiffening member secured to the central portion of said diaphragm and on the inner surface thereof, a spring disposed between said stiffening member and the bottom of said first chamber, a flexible diaphragm passing across the middle of said second chamber, and valve means attached thereto for closing off either branch of said two-way passage, said box also having passages from the outside thereof entering the second said chamber above and below the diaphragm therein.

In testimony whereof I have affixed my signature.

FREDERICK J. FLAHERTY.